Figure 1:
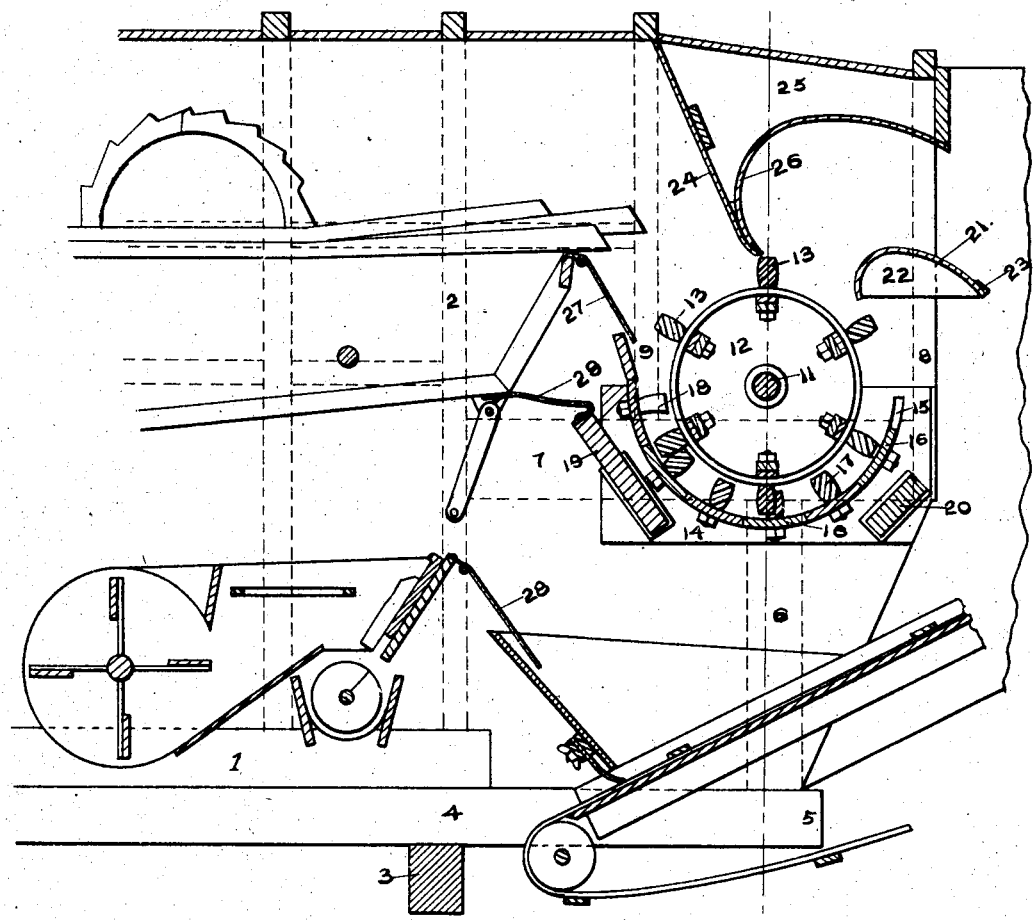

No. 834,378. PATENTED OCT. 30, 1906.
E. W. GANS & W. H. GORHAM.
SEPARATOR.
APPLICATION FILED NOV. 27, 1905.

2 SHEETS—SHEET 1.

Witnesses
J. A. Frey.
T. J. Hogan.

Inventors
Emmett W. Gans.
William H. Gorham.

By John H. Cross

Attorney

No. 834,378. PATENTED OCT. 30, 1906.
E. W. GANS & W. H. GORHAM.
SEPARATOR.
APPLICATION FILED NOV. 27, 1905.

2 SHEETS—SHEET 2.

UNITED STATES PATENT OFFICE.

EMMETT W. GANS AND WILLIAM H. GORHAM, OF MANSFIELD, OHIO, ASSIGNORS TO THE AULTMAN & TAYLOR MACHINERY COMPANY, OF MANSFIELD, OHIO, A CORPORATION OF OHIO.

SEPARATOR.

No. 834,378.　　　　Specification of Letters Patent.　　　　Patented Oct. 30, 1906.

Application filed November 27, 1905. Serial No. 289,366.

*To all whom it may concern:*

Be it known that we, EMMETT W. GANS and WILLIAM H. GORHAM, citizens of the United States of America, and residents of Mansfield, Richland county, Ohio, have invented certain new and useful Improvements in Separators, of which the following is a specification.

Our invention relates to a bruising attachment for separators.

It is well known that it is desirable and of great advantage to afford facilities to cut, break, mangle, or bruise the straw after it has passed through the threshing-cylinder and over the racks or straw-table for feeding purposes.

Our invention therefore consists in providing a means of extending the main frame or attaching an auxiliary frame to the framework of the separator and mounting thereon a cylinder (designated "bruising-cylinder") with a series of teeth projecting from its periphery and a concave having a series of similar teeth secured thereto projecting upward, forming the same radius of the teeth in the concave alternating therewith, leaving a space between them with a series of knife-teeth secured to the concave.

The objects of our improvement are to so range the bruiser-cylinder and concave with reference to the separating straw table or racks, fan, and shoe that the highest efficiency is obtained in feeding the straw therein, so that it will not cause counter-currents of air, and mounting them in the frame at such a relative position as will permit the blast from the fan to effect the thorough separation of the grain and the straw that passes over the straw-table onto the shoe, by means of which the straw, grain, and chaff is prevented from lodging in the frame and choking or clogging the cylinder or return-pan, to provide deflectors to receive the impact of the currents of air generated by the teeth of the cylinder, and to divert it from its natural course to prevent it from coming in contact with the air from the fan which is directed under the bruising-cylinder, obviating any interference with the cleaning process.

Another essential feature of our invention is the means employed to keep the air from the bruising-cylinder from conflicting with the air from the threshing-cylinder, fan, and beater, permitting the straw to be drawn into the bruising-cylinder.

A further object of the deflectors is to prevent the grain, chaff, or straw from being carried over the cylinder in the direction it is revolving after passing through and to receive the impact or force of the air-blast to prevent it from carrying the straw over the bruising-cylinder and to direct its course downward into the stacker, keeping the counter-currents of air generated from threshing-cylinder and bruiser from coming together.

A further object of the deflectors is to throw the straw into the carrier.

A further object is to confine the straw and grain within defined limits and keeping it from working back through the separator during its operation.

We attain these and other objects by the mechanism illustrated in the accompanying drawings, in which—

Figure 2:
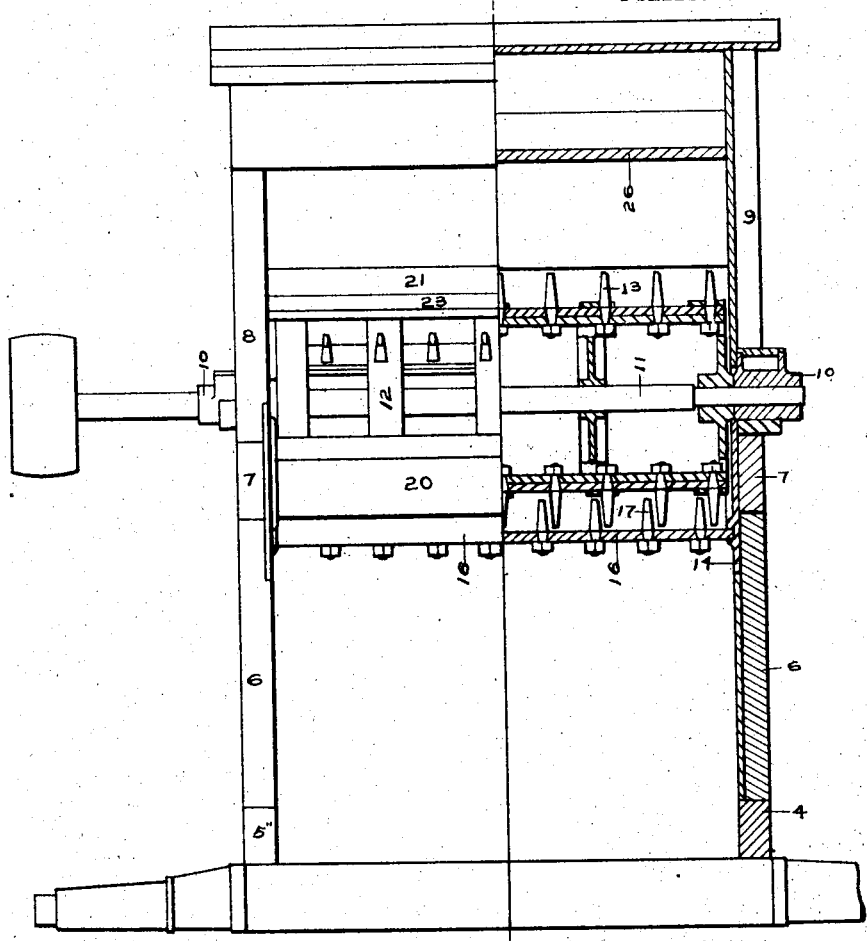
Figure 3:
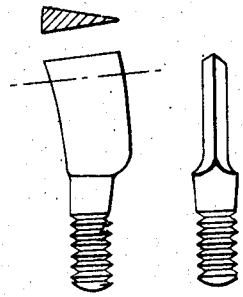

Figure 1 is a side elevation in cross-section, showing the concave cylinder, concave, and deflectors. Fig. 2 is an end, plan, and sectional view of Fig. 1. Fig. 3 is a detail of the knife-tooth.

Similar numerals refer to similar parts throughout the several views.

In the drawings, 1 and 2 represent the rear end of the frame of the separator, and 3 the rear cross beam or support upon which the frame is mounted.

In the application of our device we prefer to secure subsills 4 underneath the frame, leaving the ends 5 project rearwardly beyond the frame. Upright supports 6 are secured to the ends 5 of the subsills on one end with the opposite end adapted to support the braces 7, which are secured to the uprights 8 and 9 of the frame. Both sides of the auxiliary frame or extension are constructed in the same manner. Suitable bearings 10 are mounted on the braces 7, into which the ends of the shaft 11 of the cylinder 12 are journaled.

The cylinder is constructed in the usual manner, having series of teeth 13 attached to bars and projecting outwardly from the periphery. Concave holders 14 are securely attached to the inner faces of the braces or supports 7. Semicircular slots 15 are formed integral with the holders, extending upwardly and located below the cylinder. A semicircular concave 16 is fitted to the slots 15 and provided with a series of upwardly-projecting teeth intermeshing with the cylinder-teeth, but leaving a predetermined space or opening between them. A series of knife-teeth 18 are secured to the concave in advance of the ordinary teeth to cut the straw. The cross-braces 19 and 20 prevent lateral motion of the frame due to the movement of the cylinder when in operation.

It will be observed that the construction of the frame as described permits the cylinder and concave to be mounted directly underneath and in the rear of the straw-table and in close proximity thereto. This is of great advantage and utility, as the straw is thrown directly into the cylinder from the straw-table. A deflector 21 is preferably made of sheet-iron formed concave, circular, or a modification thereof, as shown in the drawings, is secured to the uprights 8 and extends rearwardly from the bruising-cylinder. This arrangement catches the greater portion of the straw that is emitted from the revolving cylinder on top of the elevator, which conveys it to the stacker. (Not shown.) It is secured to the frame by the end braces 22 and the brace 23. From the intersection of the top of the frame and the upright 9, extending clear across the frame of the machine, inclining rearwardly, the front plate 24 of the deflector 25 is suspended, leaving the end lying in close proximity to the periphery of the cylinder-teeth. The front plate of the deflector 25 is attached with the end slightly bent rearward. The rear plate 26 of the deflector is secured adjacent to the free end of the plate 24. It is bent upwardly and rearwardly over the top of the deflector 21. The curvature of the plate can be made concave, circular, or a modification thereof, as shown in the drawings.

The ends of the deflector 25, on account of the sweep of the front plate, form a hook or a V-shape end. The front plate 24 presents a barrier for the air, grain, and chaff and prevents it from being carried by the pressure of the air from the bruising-cylinder beyond the center of same and at the same time receives the impact of the air and deflects or diverts it from its natural course, keeping it from coming in contact or mingling with the air generated by the revolving front cylinder and beater. The plate 26 catches the air generated from the bruising-cylinder and keeps it from carrying or forcing the grain and straw forward over the same into the separator and permitting it to drop into the bruising-cylinder without interference. The cylinder and the mechanism incident thereto are confined and inclosed with defined limits by the sheet-iron aprons 27 28 and the canvas 2 during the operation of the separator.

Having fully described our invention, what we claim, and desire to secure by Letters Patent, is—

1. In a bruiser attachment for separators, an extension of the main frame, a cylinder mounted on said frame in the rear of and adjacent to the delivery end of the racks, a concave secured to said frame, a series of knife-teeth secured to said frame in advance of the concave teeth, a deflector attached to the top of the frame having a plane front and curved rear surface, an auxiliary deflector secured to frame below and in the rear of said deflector as described and set forth.

2. In a bruiser attachment for separators an extension of the main frame, a cylinder mounted on said frame in such a relative position as to receive the grain and straw adjacent to the delivery end of the racks, a deflector attached to the upper portion of the frame with the surface inclined rearwardly and the rear surface curved upward and forward said deflectors having the ends of the plates attached together at the free end suspended on the cylinder as described and set forth.

3. In a bruising attachment for separators, an extension of the main frame, a cylinder mounted in suitable bearings secured to said frame, said cylinder being mounted on said frame, in the rear of and adjacent to the straw-rack, a deflector secured to the upper portion of the frame having a plane front surface and a curved rear surface with its free end suspended over the cylinder, a similar deflector secured below and in the rear of said deflector. a concave mounted on said frame having teeth projecting upward meshing with teeth of concave cylinder, a series of knife-teeth secured to the concave.

4. In a bruiser attachment for separators, comprising an auxiliary frame, a cylinder mounted on said frame, a concave secured to said frame, a series of knife-teeth secured to said concave in advance of the concave teeth, deflectors secured to said frame and adapted to regulate the travel of the grain and straw by diverting the air from its regular course as described and set forth.

5. In a bruising attachment for separators, an extension of the main frame, a cylinder mounted on said frame in the rear of the straw-rack and adjacent thereto, a deflector secured to the top of the frame having its free end suspended over said bruising-cylinder, an auxiliary deflector secured underneath the main deflector, means for directing the current of air from the fan without interference with the air generated from the revolving bruising-cylinder.

6. In a bruising attachment for separators, an extension of the main frame, a cylinder mounted on said frame in the rear of the straw-rack and adjacent thereto, a deflector secured to the top of the frame having its free end suspended over said bruising-cylinder, an auxiliary deflector secured underneath the main deflector, means for directing the currents of air generated by the fan under the bruising-cylinder as described and set forth.

7. In a bruising attachment for separators, an extension of the main frame, a cylinder mounted on said frame in the rear of the straw-rack and adjacent thereto, a deflector secured to the top of the frame having its free end suspended over said bruising-cylinder, an auxiliary deflector secured underneath the main deflector, means for controlling the air from the fan to keep it from coming in contact with the air generated by the beater and bruising-cylinder.

8. In a bruising attachment for separators, a bruising-cylinder mounted in the rear of the separator adjacent to the ends of the straw-racks, deflector-plates secured to the frame and adapted to receive the impact of the air generated by the cylinder, a fan, means to direct the current of air generated by the fan to keep it from coming in contact with the air generated by the bruising-cylinder, as set forth.

Signed at Mansfield, Ohio, this 24th day of November, 1905.

EMMETT W. GANS.
WILLIAM H. GORHAM.

Witnesses:
W. W. MOURAN,
W. M. VAN DYKE.